No. 700,264. Patented May 20, 1902.
R. H. TRUMBULL.
ROLL HOLDING CAMERA.
(Application filed May 9, 1901.)
(No Model.)
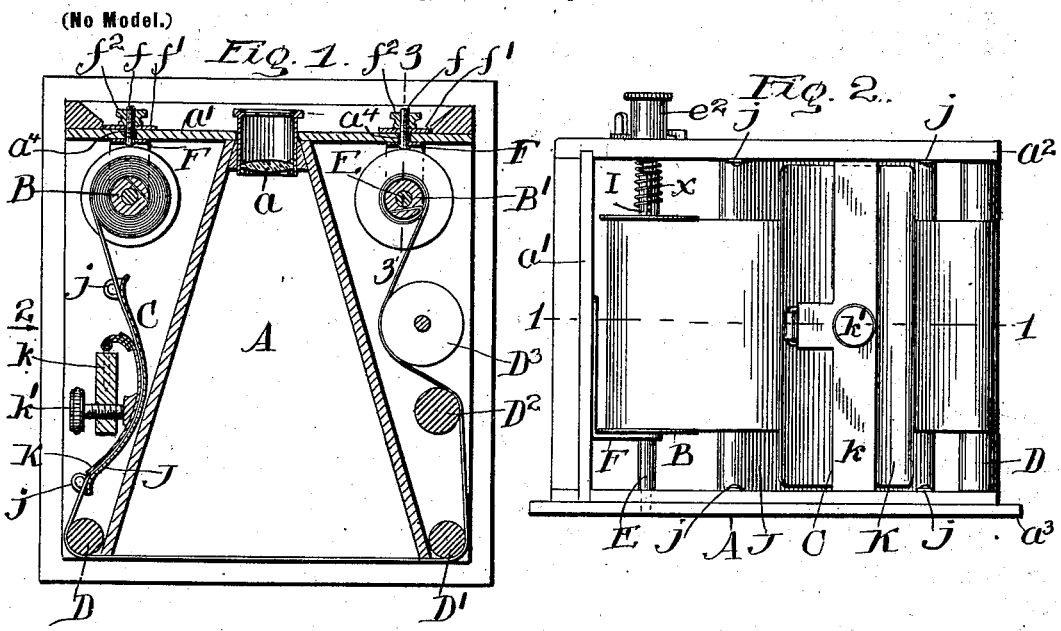
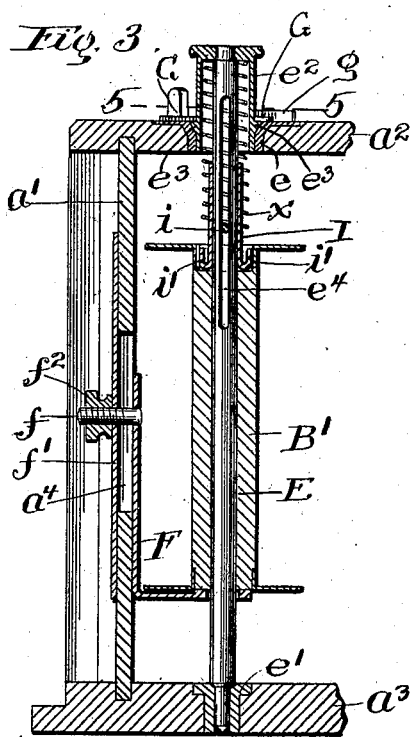
Witnesses:
Chas. O. Shervey
S. Bliss
Inventor
Rollin H. Trumbull
by Wishmurae & Bitner,
Attys.

UNITED STATES PATENT OFFICE.

ROLLIN H. TRUMBULL, OF CHICAGO, ILLINOIS.

ROLL-HOLDING CAMERA.

SPECIFICATION forming part of Letters Patent No. 700,264, dated May 20, 1902.

Application filed May 9, 1901. Serial No. 59,360. (No model.)

*To all whom it may concern:*

Be it known that I, ROLLIN H. TRUMBULL, a citizen of the United States of America, residing at Chicago, in the county of Cook and State of Illinois, have invented certain new and useful Improvements in Roll-Holding Cameras, of which the following is a specification.

My invention relates to certain improvements in devices for controlling photographic films for cameras, the object being to provide means for the accommodation of various widths of films and for otherwise controlling them, so as to keep them in the proper relative position with respect to the lens.

To such end the invention consists in certain novel features of construction, a description of which will be found in the following specification and the essential features more definitely pointed out in the claims.

In the drawings furnished herewith, Figure 1 is a view, partly in plan and partly in horizontal section, through a camera in which the invention is embodied, the line of section being indicated at 1 1 of Fig. 2. Fig. 2 is a side view of the parts seen in Fig. 1 looking in the direction of the arrow 2 in Fig. 1. Fig. 3 is a detail vertical section in line 3 3 of Fig. 1. Fig. 4 is a detail side view of a spindle upon which the film-spools are mounted. Fig. 5 is a view partly in plan and partly in horizontal section, the line of section being indicated at 5 5 of Fig. 3; and Fig. 6 is a perspective view of a portion of a clutch and a portion of one of the spools.

In the views, A represents the frame of an ordinary camera containing the film and film-controlling devices. A lens $a$ is supported in the front wall $a'$, and the film passes from the spool B through a friction device C, around two rollers D D', between which the film is exposed, and between two rollers $D^2 D^3$ to the winding-spool B'. The film is wound upon the spool B' by means of a spindle E, either by hand or automatically by suitable mechanical means. (Not shown in the drawings.)

Referring now to Figs. 3 and 4, the spool B' will be seen mounted upon the spindle E, extending longitudinally through the same, and seated in thimbles $e\ e'$, mounted in the top and bottom boards $a^2\ a^3$ of the frame A. The spool rests upon a vertically-adjustable bracket F, secured in place upon the wall $a'$ by a screw $f$, plate $f'$, and nut $f^2$. The screw is riveted in the bracket and extends out through a slot $a^4$ in the wall $a'$ and passes through a hole in the plate $f'$, which is of such size as to completely cover up the slot $a^4$ in all positions of the bracket upon the wall $a'$, and thus prevent light from entering at this place.

The upper end of the spindle E is secured in a hollow cap $e^2$, preferably knurled at its upper end and seated in the thimble $e$. A pivoted finger G, spring-pressed in one direction by a spring $g$, rests against the cap $e^2$ and upon the top of a beveled flange $e^3$, extending around the same, thus preventing the spindle from being withdrawn except when the finger G is moved away from the flange $e^3$. Upon the spindle is mounted a sliding clutch I, connected therewith so as to be non-rotatable with respect thereto, and, as shown, a pin $i$, secured in the clutch and passing through a slot $e^4$ in the spindle, may be employed for this purpose. The lower end of the clutch is formed with clutch-teeth $i'$, adapted to enter notches $b$ in the upper end of the spools (see Fig. 6) to connect the spool with the spindle. A coiled spring $x$, confined between the head of the cap and the pin $i$ on the clutch, serves to hold the latter in engagement with the spool. It is obvious that by the proper adjustment of the bracket F a great variety of sizes of films may be accommodated, from the smallest size to that which can be contained between the upper and lower walls of the frame.

To keep a certain amount of friction upon the film, the latter is passed between two curved and preferably flexible plates J K, (see Fig. 1,) the plate J being secured to the top and bottom boards $a^2\ a^3$ of the frame by means of lugs $j$. The plate K is hinged upon a post $k$, which is secured to the frame, and an adjusting-screw $k'$, threaded in the post $k$ and bearing upon the plate K, furnishes means for giving the requisite amount of friction required.

I am aware that more or less variation of the different parts is possible, and I do not, therefore, limit myself to the specific construction shown and described.

I claim as new and desire to secure by Letters Patent—

1. In a camera, a spindle adapted to pass longitudinally through the film-spools and form the axis of rotation thereof, and a bracket supported upon one of the walls of the camera-box and adapted to be adjusted upon said box to accommodate various sizes of spools; substantially as described.

2. In a camera, the combination with a rotatable spindle, of a bracket adapted to support the film-spools, secured to the camera-box and longitudinally adjustable upon said box to accommodate various sizes of spools, and a clutch sliding upon said spindle, non-rotatable with respect thereto and engaging the spools; substantially as described.

3. In a camera, the combination with a vertically-adjustable bracket adapted to support the film-spools, of a spindle forming the axis of rotation of said spools, and extending without the camera in the form of a knob by means of which the spool may be rotated, a clutch longitudinally movable upon said spindle but non-rotatable with respect thereto, and adapted to positively engage the spool, and a spring to hold said clutch in engagement with the spool; substantially as described.

4. In a camera, the combination with a camera-box, of a spindle adapted to receive the film-spool, a bracket for supporting the spindle, a screw-threaded pin secured in the bracket and extending out through a suitable slot in the wall of the box, and a nut upon the end of the pin for screwing the bracket in place; substantially as described.

In witness whereof I have hereunto set my hand, at Chicago, in the county of Cook and State of Illinois, this 4th day of May, A. D. 1901.

ROLLIN H. TRUMBULL.

Witnesses:
 CHAS. O. SHERVEY,
 S. BLISS.